Nov. 12, 1935.   H. FORD   2,020,406
INTERNAL COMBUSTION ENGINE CRANK SHAFT
Filed Feb. 2, 1933
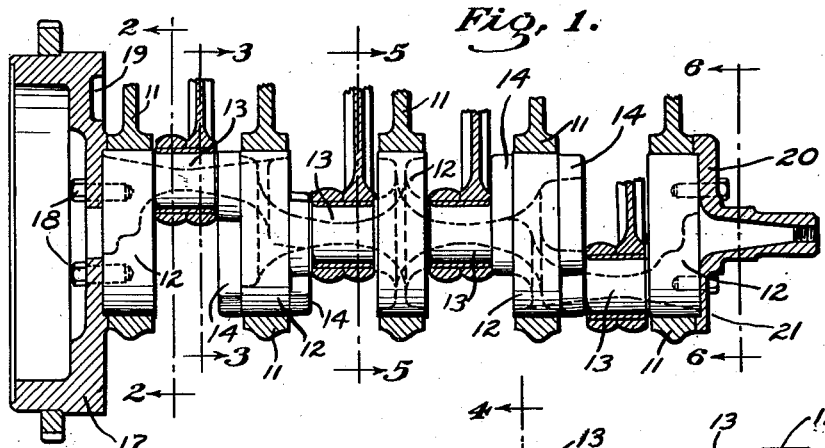
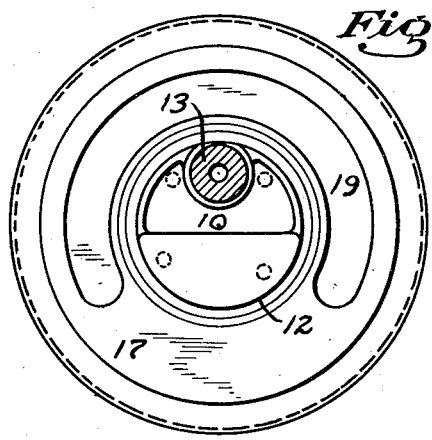
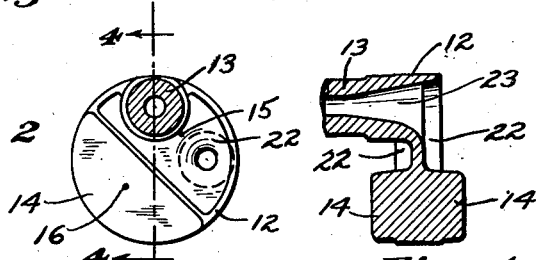
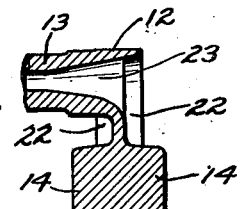
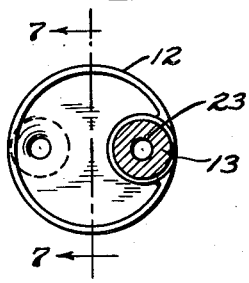
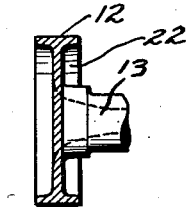
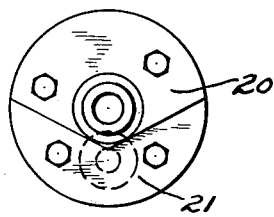
INVENTOR.
Henry Ford
BY
ATTORNEY.

Patented Nov. 12, 1935

2,020,406

UNITED STATES PATENT OFFICE 2,020,406

INTERNAL COMBUSTION ENGINE CRANK SHAFT

Henry Ford, Dearborn, Mich., assignor to Ford Motor Company, Dearborn, Mich., a corporation of Delaware Application February 2, 1933, Serial No. 654,925

5 Claims. (Cl. 74—596)

The object of my invention is to provide a crank shaft for multicylinder internal combustion engines which will possess great strength and exceptional rigidity, thereby eliminating or materially reducing the torsional vibration of the engine.

A further object of my invention is to provide a multicylinder engine crank shaft wherein the shaft and crank pins and counterbalancing weights are formed as an integral casting. Heretofore, crank shafts for this purpose have invariably been forged from steel; however, my improved shaft can be made at no greater cost and results in a shaft having a reduced weight without sacrificing strength or rigidity. The reduced weight of my shaft is attributable to the unique counterbalancing employed in this shaft, which counterbalancing is commercially possible by reason of the shaft being a casting.

It is well known that to correctly dynamically balance a crank shaft it is necessary to place a weight diametrically opposite each crank pin, this weight equaling the weight of the crank pin plus the weight of the adjacent end of the crank pin connecting rod or rods, as in V-type motors. This weight is preferably proportioned between the two cheeks of the crank shaft adjacent to the particular crank pin so that its effective point will be diametrically opposite the center of the crank pin to thus eliminate the rotating couple otherwise produced. In order to accomplish this purpose it has long been the practice to secure weights to the cheeks of the shaft heavy enough to place each crank pin throw in rotary balance. I depart from this conventional practice in that I provide segment-shaped recesses in the shaft aligned with the crank pins, these recesses assisting in counterbalancing the crank pins. For this reason I am able to dynamically balance the shaft by the addition of a much smaller amount of metal opposite to each crank pin than was formerly required.

My improved crank shaft is especially adapted for use in V-type motors where relatively large counterbalancing weights have heretofore been required. Such motors have two connecting rods journaled on each crank pin so that it is necessary to counterbalance one half the weight of both rods, in contrast to counterbalancing only one half the weight of one rod, as in the single block engines. Further, the construction of my shaft allows the cylinders of each cylinder block to be located adjacent to each other, thereby reducing the overall length of such engine.

Still a further object of my invention is to provide a crank shaft and engine flywheel wherein the flywheel is purposely machined out of balance sufficiently so that its heavy side counterbalances one of the otherwise unbalanced force in the engine.

With these and other objects in view my invention consists in the construction of my improved device, as described in the specification, claimed in my claims and illustrated in the accompanying drawing, in which:

Figure 1 shows a central vertical sectional view through an eight-cylinder V-type engine having my improved crank shaft installed therein.

Figure 2 shows a sectional view, taken on the line 2—2 of Figure 1.

Figure 3 shows a sectional view, taken on the line 3—3 of Figure 1.

Figure 4 shows a sectional view, taken on the line 4—4 of Figure 3.

Figure 5 shows a sectional view, taken on the line 5—5 of Figure 1.

Figure 6 shows a sectional view, taken on the line 6—6 of Figure 1, and

Figure 7 shows a sectional view, taken on the line 7—7 of Figure 5.

The crank shaft, shown in Figure 1, although specially adapted for use in eight-cylinder V-type engines may readily be designed for use in single-block motors having any operable number of cylinders. The number of cylinders is not particularly important as each throw of the crank shaft is placed in rotative balance independently of the remaining throws so that the shaft may be made of any desirable length.

For obvious reasons the present tendency in automibile engine construction is to provide a larger number of cylinders for a given engine capacity; that is, six, eight and twelve-cylinder engines are being used in preference to the older four-cylinder engine. Such engines must necessarily have smaller cylinders than those in the older engines so that, if placed in a single row, their combined length is considerably longer than the length of the older type engines of the same cubic-inch capacity or displacement. This characteristic is undesirable in automobile construction, as it shortens the available passenger room in the car. In order to reduce the length of such engines, the V-type construction has been employed and their cylinders have been made still smaller while their compression ratios have been increased thereby obtaining an increased horse power with a comparative short engine. The one disadvantage of such construction is that, due to this increased horse power, larger crank shaft bearings are required, while, due to the reduced length of the engine, less length is available for crank shaft bearings. Still further, the increased horse power developed has heretofore required greater rigidity in the cheeks forming the crank pin throws, requiring these cheeks to be made thicker which resulted in still more crank shaft length being lost for bearing purposes. The applicant overcomes this disadvantage by providing bearing surfaces extending over substantially the full length of his crank shaft, thereby eliminating the length formerly lost by reason of the crank shaft cheeks. This construction will be brought out more fully in the specification and drawing wherein:

The numeral 10 is used to designate my improved crank shaft, which shaft is adapted to be rotatably mounted in an engine cylinder block having a plurality of main bearings 11 formed therein. My crank shaft comprises a plurality of disk-shaped bearing members 12, the peripheries of which are rotatably mounted in the bearings 11. Each pair of the disks 12 are joined by a crank pin 13, these pins being angularly spaced at 90-degree intervals around the main bearing axis in the conventional manner. It will be noted that the disks 12 are of a diameter larger than the path described by the crank pins 13 so that the cheeks of the crank shaft, if any, lie within the peripheries of the disks 12. With this type of shaft it is not only possible but it is desirable to dispense with the conventional split-type crank shaft main bearing construction and substitute therefor solid bearings, as shown at 11. The shaft may thus be inserted axially into the cylinder block.

Now in order to dynamically balance such shaft it is necessary to rotatively balance each particular crank pin and the heavy ends of the connecting rods which are journaled on each particular crank pin. To do this the crank shaft is provided with counterweights 14 disposed opposite to each particular crank pin. For instance, in Figures 3 and 4, it will be noted that I have provided counterweights 14 disposed diametrically opposite to the crank pins 13, these counterweights being required to weigh sufficient to counteract a portion of the combined weight of the crank pins and heavy ends of their connecting rods. Inasmuch as the disk 12, shown in Figure 3, has a crank pin 13 extending axially from each side thereof which crank pins are positioned 90 degrees apart, the counterweights 14 on each side of this disk are required to counterbalance at least one half the weight of both crank pins and the heavy ends of the four connecting rods associated with these two pins. The effective weight center of these pins is designated by numeral 15 so that the center of mass of the weights 14, as shown by numeral 16 is disposed diametrically opposite to the center 15.

It is apparent that each crank pin is counterbalanced by two weights, one on each adjacent face of the two adjacent disks 12. A novel feature of this construction is provided to shorten the length of the engine by eliminating the length required for two of these counterweights. It will be noted that the extreme left-hand crank pin 13, shown in Figure 1, is counterbalanced partly by the weight 14 on the disk to the right. The disk to the left, however, is not provided with a similar counterweight, as such would require extra length for the shaft. The crank pin is nevertheless balanced by the flywheel of the engine. This flywheel is given the numeral 17 and is bolted directly to the left-hand disk by means of a plurality of cap screws 18. These screws are unequally spaced so that the flywheel can be assembled to the disk in only one position. An annular groove 19 is machined in the flywheel part way around its periphery so that the opposite side of the flywheel is considerably heavier than the side with the groove therein. This cut of balance in the flywheel coacts with the adjacent weight 14 to completely balance the left-hand crank pin.

The extreme right-hand crank pin is balanced in a similar manner by providing a plate 20 which is adapted to be detachably secured to the forward or right-hand disk of the shaft. One side of this plate is machined off, as shown at 21 in Figure 6, to thereby place the plate out of balance. The plate is, of course, secured to the forward disk in position diametrically opposite to the end crank pin which it helps to balance. Thus, the crank shaft length required for weights similar to weights 14 is eliminated to thus shorten the engine an equivalent amount.

With the type of shaft shown the counterweights must lie wholly within the peripheries of the disks 12 so that the radii of their centers of mass are very small, consequently exceptionally heavy weights are required. If the disks 12 were formed with a uniform thickness then the only effective portion of the counterweight would be that portion which projected beyond the sides of the disks. In order to increase the effectiveness of the counterweights the disks 12 are formed having relatively thin central webs, as shown in Figures 4 and 7, which may perhaps better be described by saying that each of the disks 12 is recessed around its connection with each crank pin. These recessed portions are designated by numeral 22. Consequently, for each cubic inch of space in the recess 22 the counterweights may be reduced .28 pounds.

It will also be noted that each crank pin 13 is cored out, as shown at 23, which still further reduces the unbalanced force of these pins. It is not contended that providing an axial opening through the crank pin is new for balancing; however, it is believed that recessing the disks of this type of crank shaft is new and of the utmost importance in balancing such shaft.

At first glance it appears that it would be impossible to form the crank shaft shown, because such shaft could not be forged and machined commercially in the conventional manner. The machine work on crank shafts must be done by turning or milling and such shafts must be forged so that they can be machined by ordinary shop practice. To compete in the present market crank shafts are invariably forged so that only turning operations, and perhaps the bolting of counterweights in place, are required to completely machine the shaft. The applicant's recesses 22 can not either be forged in place nor can they be commercially machined in position. Thus, without a special way of forming the crank shaft, this idea for lessening the counterweight mass required would be worthless. For this reason it may perhaps be well to briefly outline the procedure in forming this shaft.

I prefer to form the shaft as an integral casting of iron having a low coefficient of elasticity to thus provide an extremely rigid shaft. It has been found that when the crank pins of my shaft are proportioned rigid enough to prevent appreciable torsional vibration, even when formed of metal of a very low coefficient of elasticity, such shaft is amply strong to transmit the engine torque although the metal thereof has not an exceptionally high elastic limit or ultimate strength. For this reason a semi-steel casting or even cast iron is quite satisfactory for this purpose.

To cast the shaft it is preferable to provide a plurality of superimposed molds, one for each crank pin, and to locate these molds one above the other. Each of these molds is formed with spaces therein corresponding to the particular crank pins, one half of each adjacent disk, and the adjacent counterbalance weight. The molds when secured in position are aligned with their crank pin openings properly spaced in angular relation to each other and then liquid metal is fed into the bottom of the group of molds, the metal filling all the voids therein so as to form a casting of the desired shape.

Among the many advantages arising from the use of my improved device it may be well to mention that I have provided a crank shaft which may be inserted axially through aligned bearing openings in the engine casting and which crank shaft is provided with a main bearing between each of its crank pins.

Further, such shaft is provided with integral counterweights for each crank pin to thus place the shaft in dynamic balance.

Still further, by providing recesses within the main bearings of the shaft in position opposite to the counterweights, these counterweights may be made materially lighter to thus materially reduce the length of a given size of engine.

Still further, the length of such engine is further reduced by reason of the flywheel unbalance counteracting a portion of the crank shaft unbalance.

Some changes may be made in the arrangement, combination and construction of the various parts of my improved device without departing from the spirit of my invention and it is my intention to cover by my claims such changes as may reasonably be included within the scope thereof.

I claim as my invention:

1. An internal-combustion engine crank shaft having an eccentrically disposed crank pin connected to an adjacent crank pin arm characterized by said crank shaft being formed as a one piece casting, said crank pin having a hollow round cross section of gradually varying internal diameter whereby walls of varying thickness are formed throughout its length, with said adjacent crank pin arm consisting of a web portion having an opening therein aligned with the axis of said crank pin, the inner walls of said crank pin merging with one face of said web of the adjacent crank arm and the outer bearing walls of said crank pin merging with the opposite face of the same web.

2. A crank shaft, as claimed in claim 1, wherein a counterbalancing weight is cast integrally with said web to form a section materially thicker than the thickness of said web so that during the casting of the shaft the crank pin and crank pin arm will normally solidify at the same time and before the counterweight solidifies.

3. An internal-combustion engine crank shaft having an eccentrically disposed crank pin connected to an adjacent crank pin arm characterized by said crank shaft being formed as a one piece casting, said crank pin having a hollow round cross section of gradually varying internal diameter whereby walls of varying thickness are formed throughout its length, with said adjacent crank pin arm consisting of a web portion having an opening therein aligned with the axis of said crank pin, said web portion being of substantially the same thickness as the walls of said annular crank pin, the inner walls of said crank pin gradually merging along curved paths of appreciable radii with one face of said web on the adjacent crank arm and the outer bearing walls of said crank pin merging along curved paths of lesser radii with the opposite face of said web, and said web having a counterbalancing weight formed therewith in position substantially diametrically opposed to its crank arm portion.

4. A crank shaft, as claimed in claim 3, wherein said counterbalancing weight is formed integrally with said web so that during the casting of the shaft the crank pin and crank arm will normally solidify at the same time and before the counterweight solidifies.

5. An internal-combustion engine crank shaft having a plurality of eccentrically disposed crank pins interposed between adjacent connecting crank arms characterized by said crank shaft being formed as a one piece casting, with each of said crank pins having a hollow round cross section of gradually varying internal diameter whereby walls of varying thickness are formed throughout its length, each of said crank arms consisting of a web portion having an opening therein aligned with the axis of each adjacent crank pin, the inner walls of each crank pin merging with one face of said web of the adjacent crank arm and the outer bearing walls of said crank pin merging with the opposite face of the same web, a plurality of said webs having counterbalancing weights formed integrally therewith in positions substantially diametrically opposed to the adjacent crank pins.

HENRY FORD.